US009564732B2

(12) United States Patent (10) Patent No.: US 9,564,732 B2
Urakawa et al. (45) Date of Patent: Feb. 7, 2017

(54) OPTICAL RESONATOR SYSTEM (71) Applicant: INTER-UNIVERSITY RESEARCH INSITUTE CORPORATION HIGH ENERGY ACCELERATOR RESEARCH ORGANIZATION, Tsukuba-shi, Ibaraki (JP)

(72) Inventors: Junji Urakawa, Tsukuba (JP); Kazuyuki Sakaue, Tokyo (JP)

(73) Assignee: INTER-UNIVERSITY RESEARCH INSTITUTE CORPORATION HIGH ENERGY ACCELERATOR RESEARCH ORGANIZATION, Ibaraki (JP)

( * ) Notice: Subject to any disclaimer, the term of this patent is extended or adjusted under 35 U.S.C. 154(b) by 0 days.

(21) Appl. No.: 14/779,718

(22) PCT Filed: Sep. 12, 2013

(86) PCT No.: PCT/JP2013/075379
§ 371 (c)(1),
(2) Date: Sep. 24, 2015

(87) PCT Pub. No.: WO2014/155776
PCT Pub. Date: Oct. 2, 2014

(65) Prior Publication Data
US 2016/0190766 A1  Jun. 30, 2016

Related U.S. Application Data

(60) Provisional application No. 61/805,026, filed on Mar. 25, 2013, provisional application No. 61/830,442, filed on Jun. 3, 2013.

(51) Int. Cl.
*H01S 3/10*  (2006.01)
*H01S 3/13*  (2006.01)
(Continued)

(52) U.S. Cl.
CPC ........... *H01S 3/1305* (2013.01); *H01S 3/0816* (2013.01); *H05G 2/00* (2013.01)

(58) Field of Classification Search
CPC ............................. H01S 3/1305; H01S 3/0816
See application file for complete search history.

(56) References Cited

U.S. PATENT DOCUMENTS 5,594,745 A * 1/1997 Oka .................... H01S 3/10092
372/21
2010/0315642 A1* 12/2010 Chow ..................... G01J 3/433
356/432

(Continued)

FOREIGN PATENT DOCUMENTS

JP     8-6082 A     1/1996
JP     8-204275 A   8/1996
(Continued)

OTHER PUBLICATIONS

International Search Report from corresponding International Application No. PCT/JP2013/075379, dated Oct. 22, 2013, 2 pages.

*Primary Examiner* — Yuanda Zhang
(74) *Attorney, Agent, or Firm* — Brinks Gilson & Lione (57) ABSTRACT

It has been very difficult to accumulate strong laser in the conventional optical resonator, because firstly it has been very difficult to control a resonator length less than 1 Å in resonation position which is required for the laser amplification more than 1,000 times and secondly, the conventional method has utilized laser strength of amplified laser in the optical resonator as the resonance control signal.

The present invention provides an optical resonator system to accumulate strong laser. In the system, unamplified modulation wave or harmonic which are derived from oscillation laser are selectively used to tune a resonator length of the optical resonator.

4 Claims, 8 Drawing Sheets

(51) Int. Cl.
*H05G 2/00* (2006.01)
*H01S 3/081* (2006.01)

(56) References Cited

U.S. PATENT DOCUMENTS

2013/0058364 A1  3/2013  Huber et al.
2013/0064258 A1  3/2013  Fujimoto et al.

FOREIGN PATENT DOCUMENTS

| JP | 10-125983 A | 5/1998 |
| JP | 2011-514009 A | 4/2011 |

\* cited by examiner

OPTICAL RESONATOR SYSTEM

INCORPORATION BY REFERENCE

The present application is a 371 application of PCT/JP2013/075379 having an international filing date of Sep. 12, 2013, which claims priority to U.S. provisional application Nos. 61/805,026 filed Mar. 25, 2013 and 61/830,442 filed on Jun. 3, 2013, the contents of which are hereby incorporated by reference into this application.

TECHNICAL FIELD

The present invention relates to an optical resonator system to accumulate strong laser.

BACKGROUND ART

Recently, R & D of a high-luminance of X-ray generator using laser Compton scattering has been watched. Here, laser Compton scattering is that radiation rays like X-ray are generated at collision of laser beam and electron beam. Laser Compton scattering requires very high pulse-strength of laser and high luminance of electron beam. However, the production of high pulse-strength of laser has been very difficult as described below.

An optical resonator has been known as a tool to accumulate laser. An optical resonator is, in principle, a tool to amplify laser through laser-interference on the resonator mirror surfaces, accordingly, the amplification depends on reflectance of the resonator mirror. As the optical resonator, the Fabry-Perot ring resonator, Michelson interferometer-typed resonator, Fox-Smith interferometer-typed resonator, Mach-Zehnder interferometer-typed resonator, and the like have been known.

Laser-amplification by optical resonators is only made under the condition that a resonator length is equal to an integral multiple of a half wavelength of laser. This is so-called a stationary wave is standing. Because the resonance width of a stationary wave is determined by reflectance of resonator mirrors, the more the reflectance of mirrors becomes high, the more the resonance width becomes narrow, when intend to obtain high gains. For example, if supposing a resonator for obtaining gains of 1,000 times using the mirrors with reflectance of 99.9%, the resonance width is to be 24 kHz or about 1 Å ($10^{-10}$ m) in resonance position. Consequently, the resonance state will easily disappear by environmental disturbance of mechanical vibrations and thermal expansion. In order to maintain the resonance state, extremely precise feedback-regulation using piezoelectric driving of the resonator mirrors has been required. However, laser magnification achieved by the conventional optical resonators has been limited to about 1,000 times due to limitations of mechanical regulation.

For example, when laser is amplified and accumulated in the conventional optical resonator using a commercially available high-strength of mode-lock laser oscillator (50 W power, 10 psec/pulse pulse-length, 1064 nm wavelength, 150 MHz repetition), the pulse-strength of accumulated laser has been limited to about 100 μJ. The above conventional high-strength of mode-lock laser oscillator is very expensive. Also, there has been a problem that the conventional optical resonator loses most of the accumulation efficiency due to thermal deformation of the conventional resonator mirror because a heat loss of 100 ppm usually arises on the mirror even if laser oscillated by the conventional high-strength of mode-lock laser oscillator may be amplified and accumulated in the optical resonator.

Many techniques to maintain the resonance state of the optical resonator have been presented (Patent Literatures 1-6).

The Patent Literature 1 is the invention relating to the stabilization of a laser oscillator. The Patent Literature discloses the method to stabilize the oscillation frequency of the laser oscillator (1): wherein, the laser being oscillated by the laser oscillator (1) is frequency-modulated by the modulator (3), the frequency-modulated laser is put in the frequency discriminator (6), resonated with a prescribed frequency, taken out from the frequency discriminator (6), and used for the stabilization of the laser oscillator (1). In this method, an error signal is made from the frequency difference between the frequency of the frequency-modulated laser being taken out from the frequency discriminator which is reflecting the resonance state of the frequency discriminator (6) and that of the former frequency-modulated laser, and the frequency of the oscillator (1) is stabilized by using the error signal. That is, the method disclosed in the Patent Literature is well known as the conventional method to stabilize an optical resonator. However, the Patent Literature does not disclose any of a feedback control system to utilize unamplified modulation wave or harmonic.

The Patent Literature 2 is the invention relating to the laser oscillator for optical communication. The Patent Literature discloses the method to stabilize of the optical ring fiber resonator (4): wherein, a single mode laser being oscillated by a single mode laser oscillator (11) is phase-modulated by an electric signal generator (12), the phase-modulated laser is put in an optical loop path of the optical ring fiber resonator (4) comprising plural optical doped ring fibers, an error signal is made from the phase difference between the laser being taken out from the optical loop path and the former single mode laser, the piezoelectric device (9) is driven by the error signal, and an optical loop length of the optical ring fiber resonator (4) is regulated by the piezoelectric device (9). However, there has been unresolved the problem that the pulse power of the optical ring fiber resonator (4) becomes instable because the thermal expansion of the optical doped ring fiber becomes larger with increasing the strength of the accumulated laser in the optical loop path. Although the Patent Literature 2 is an invention relating to the fiber laser oscillator for optical communication, the Patent Literature does not disclose any of a feedback control system to utilize unamplified modulation wave or harmonic.

The Patent Literature 3 is the invention relating to a whispering-gallery mode resonator using the Mach-Zehnder interferometer-typed resonator. The Patent Literature discloses the method to stabilize the Mach-Zehnder interferometer-typed resonator (110), comprising: a beam splitter (113); plural reflection mirrors (114-116); a reference resonator (130) which are arranged in the inner optical path of the resonator; wherein, the laser beam being oscillated by the laser oscillator (101) is split into two beams, one split beam is put in the detection module (120) being arranged in the outside of the optical path via the reference resonator (130), another split beam is directly put in the detection module (120), an error signal is made by the detection module (120), and the reference resonator (130) and/or laser oscillator (101) are tuned by the error signal. Although the Patent Literature discloses the whispering-gallery mode resonator using the Mach-Zehnder interferometer-typed resonator, the Patent Literature does not disclose any of a feedback control system to utilize unamplified modulation wave or harmonic.

The Patent Literature 4 is the invention relating to the Fourier domain mode locking (FDML) operation, a speed-up technique of a high speed wavelength scanning optical fiber oscillator for optical communication. The Patent Literature discloses the feedback control system using operational parameters such as filter tuning, laser gain, polarization, polarization chromaticity, elliptical polarization retardance, and/or dispersion, in order to improve the stability of the Fourier domain mode locking (FDML) operation. Although the Patent Literature discloses the method to stabilize the optical fiber oscillator for optical communication, the Patent Literature does not disclose any of a feedback control system to utilize unamplified modulation wave or harmonic.

The Patent Literature 5 is the invention relating to a method controlling an optical path of an optical resonator. Although the Patent Literature discloses the method to adjust the movement of plural mirrors being arranged in the resonator by adjusting a laser incident angle when the laser is radiated to a lattice, the Patent Literature does not disclose any of a feedback control system to utilize unamplified modulation wave or harmonic.

The Patent Literature 6 is the invention relating to a method to stabilize a wavelength converter to oscillate harmonics. The Patent Literature discloses the wavelength converter oscillating harmonics: wherein, the laser being oscillated by the laser oscillator (12) is radiated to the nonlinear optical material (14) being arranged in the optical resonator (16), the second harmonic is generated thereby, the generated second harmonic is detected by the wave detector (18) being arranged at the back of the mirror (24) of the optical resonator (16), the detected signal is put in the electronic servo circuit to generate an error signal in proportion to the difference in resonance frequency, and the error signal is transmitted to the piezoelectric device (30) being attached to the mirror (26) or the electrodes (32, 34) being attached to the nonlinear optical material (14) to control a resonator length of the optical resonator (16) and/or electric field strength being loaded to the nonlinear optical material (14). Although the Patent Literature discloses the wavelength converter to oscillate the second harmonic and its stabilization method, the Patent Literature does not disclose any of a feedback control system to utilize unamplified modulation wave or harmonic.

The optical resonator system and resonance control method which have been disclosed in the Patent Literatures 1-6 include several difficult problems. As described above, firstly, it has been very difficult to accumulate strong laser in the conventional optical resonator because it has been very difficult to control a resonator length less than 1 Å in resonation position which is required for the laser amplification more than 1,000 times. Secondly, it has been difficult to accumulate strong laser in the conventional resonator because the conventional method has utilized laser strength of amplified laser in the optical resonator as the resonance control signal. That is, the strength of accumulated laser becomes very large when laser is amplified by the conventional method, which induces the occurrence of thermal deformation and laser damage of the resonator mirror due to large heat load on the mirror, and finally generates large resonance fluctuation.

Other objects, features and advantages of the invention will become apparent from the following description of the embodiments of the invention taken in conjunction with accompanying drawings.

CITATION LIST

Patent Literature 1: JP-A-1996-204275
Patent Literature 2: JP-A-1998-125983
Patent Literature 3: JP-A-2011-514009
Patent Literature 4: US-A-2013-0058364
Patent Literature 5: US-A-2013-0064258
Patent Literature 6: JP-A-1996-6082

SUMMARY OF THE INVENTION

Technical Problem

The object of the present invention is to provide an optical resonator system to accumulate strong pulse laser. In more detail, the object of the present invention is to provide the optical resonator system which equips an optical resonator being able to receive both light of pre-amplified laser and unamplified modulation wave or modulation harmonic at the same time and a new type of feedback control system being able to tune a resonator length of the optical resonator with the unamplified modulation wave or harmonic.

Solution to Problem

As the result of extensive studies to achieve the above described object, the present inventors have found: it is very useful for the accumulation of strong pulse laser that unamplified modulation wave or harmonic being derived from oscillation laser is used to tune a resonator length of the optical resonator, and have achieved the present invention based on this finding.

That is, the present invention is:

1. An optical resonator system, comprising: an optical resonator; path-1 that connects a laser oscillator and laser amplifier in series to mirror-1 of the optical resonator; path-2 that connects a laser oscillator and electrooptic modulator to modulate the oscillation laser to a modulation wave in series to mirror-1 of the optical resonator; path-3 that connects mirror-1 of the optical resonator and feedback control system to make an error signal from the modulation wave in series to a piezoelectric device of the optical resonator.

2. An optical resonator system, comprising: an optical resonator; path-1 that connects a laser oscillator and laser amplifier in series to mirror-1 of the optical resonator; path-2 that connects a laser oscillator, wavelength converter to convert the oscillation laser to a harmonic and electrooptic modulator to modulate the harmonic to a modulation harmonic in series to mirror-1 of the optical resonator; path-3 that connects mirror-1 of the optical resonator and feedback control system to make a feedback control signal from the modulation harmonic in series to a piezoelectric device of the optical resonator.

3. The optical resonator system according to the above 1: wherein, the optical resonator is a 4-mirror optical resonator.

4. The optical resonator system according to the above 2: wherein, the optical resonator is a 4-mirror optical resonator.

Advantageous Effects of Invention

The present invention provides an optical resonator system which equips an optical resonator and new type of feedback control system. The optical resonator of the present optical resonator system is able to receive both light of pre-amplified laser being made from oscillation laser and unamplified modulation wave or modulation harmonic being made from oscillation laser at the same time, furthermore to amplify the pre-amplified laser by about 10,000 times and to stably accumulate the amplified laser. The feedback control system of the present optical resonator system is able to tune a resonator length of the optical resonator with a resonation position less than 0.1 Å using the unamplified modulation wave or harmonic being made from oscillation laser of which pulse strength is less than $1/10,000$ compared to that of the amplified laser. This makes thermal deformation and laser damage of the resonator mirror decrease to a level less than $1/10,000$ in comparison to those for the conventional optical resonator. Accordingly, the present invention is able to stably accumulate a mega-watt class of strong laser with pulse strength of 1 mJ or more.

DETAILED DESCRIPTION OF THE PREFERRED EMBODIMENTS

Hereinafter, the present invention will be specially explained as an execution embodiment using the following drawings.

Figure 9:
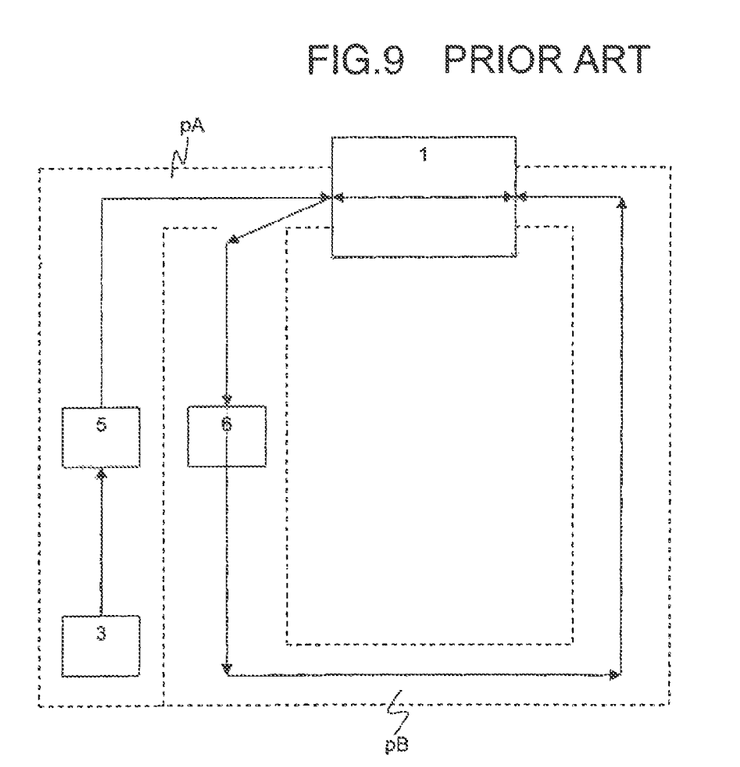
FIG. 9 shows a schematic structural view illustrating the conventional system to tune a resonator length.

FIG. 9 shows the conventional system, comprising: an optical resonator (1); path-A (pA) connecting a laser oscillator (3) and electrooptic modulator (5) to the optical resonator (1); path-B (pB) connecting an optical resonator (1) and feedback control system (6). In the pA, laser being oscillated by the laser oscillator (3) is introduced into the electrooptic modulator (5), modulated to a modulation wave thereby, and introduced into the optical resonator (1). In the pB, laser exuding from the optical resonator (1) is introduced into the feedback control system (6), converted into a feedback control signal thereby, and transmitted to a piezoelectric device of the optical resonator (1). In this system, when laser is greatly amplified by the optical resonator, thermal deformation and laser damages being applied to the mirrors of the optical resonator becomes so large that the control of the optical resonator length is very difficult.

Figure 1:
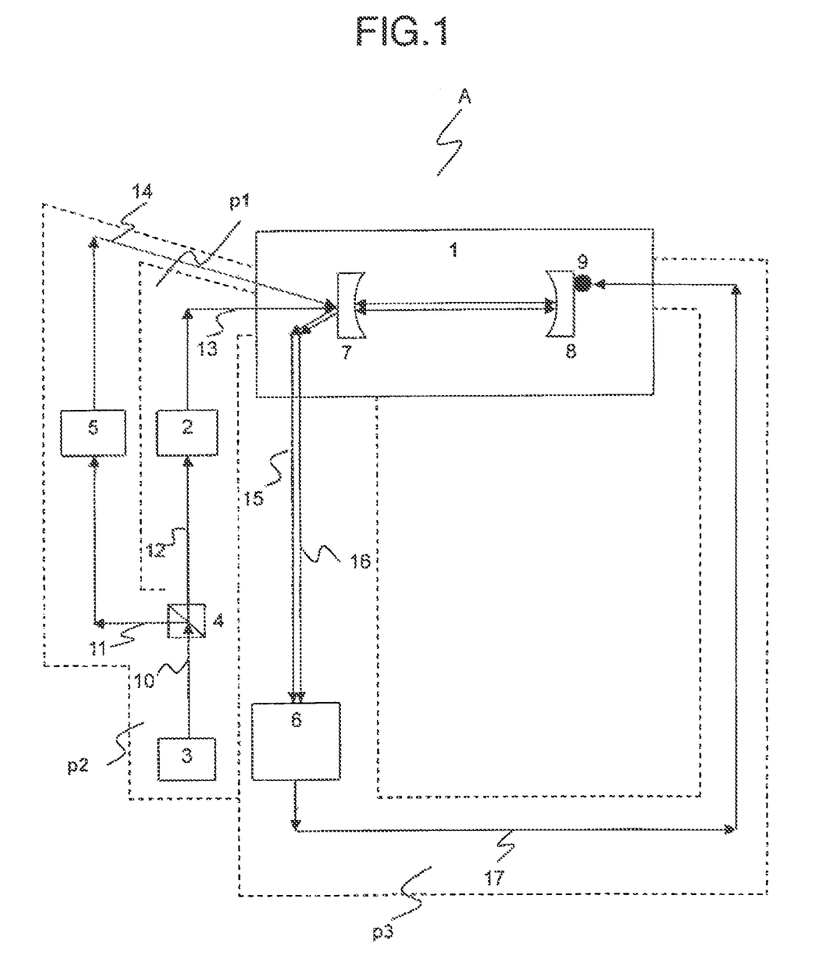
FIG. 1 is a schematic structural view illustrating an execution embodiment of the present invention to tune an optical resonator using unamplified modulation wave.

FIG. 1 shows the optical resonator system (A), comprising: an optical resonator (1); path-1 (p1) that connects a laser oscillator (3) and laser amplifier (2) in series to mirror-1 (7) of the optical resonator (1); path-2 (p2) that connects a laser oscillator (3) and electrooptic modulator (5) to modulate the oscillation laser to a modulation wave in series to mirror-1 (7) of the optical resonator (1); path-3 (p3) that connects mirror-1 (7) of the optical resonator (1) and feedback control system (6) to make an error signal from the modulation wave in series to a piezoelectric device (9) of the optical resonator (1). In the p1, oscillation laser (10) being oscillated by the laser oscillator (3) is introduced into a beam splitter (4), split into two beams (11,12), one beam (12) is amplified by the laser amplifier (2) and introduced into the optical resonator (1) through mirror-1 (7). In the p2, another beam (11) being split by the beam splitter (4) is introduced into the electrooptic modulator (5), modulated to a modulation wave thereby and introduced into the optical resonator (1) through mirror-1 (7). In the p3, the superposition waves of unamplified modulation wave (15) being reflected by mirror-1 (7) and modulation wave (16) exuding from the optical resonator (1) through mirror-1 (7) are introduced into the feedback control system (6), converted to a feedback control signal thereby and transmitted to the piezoelectric device (9) being attached to a mirror (8). This is the system for the case using one oscillation laser source.

Figure 2:
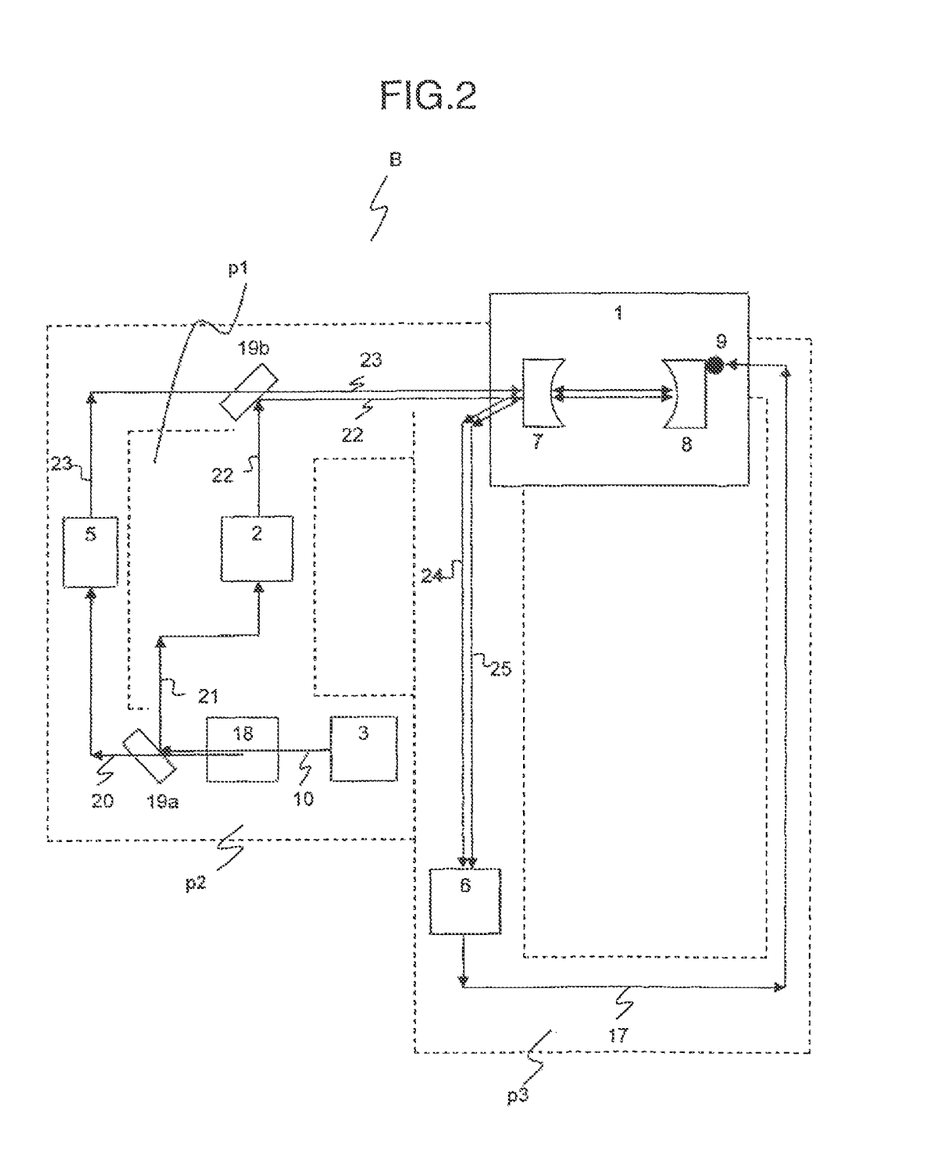
FIG. 2 is a schematic structural view illustrating an execution embodiment of the present invention to tune an optical resonator using unamplified harmonic.

FIG. 2 shows the optical resonator system (B), comprising: an optical resonator (1); path-1 (p1) that connects a laser oscillator (3) and laser amplifier (2) in series to mirror-1 (7) of the optical resonator (1); path-2 (p2) that connects the laser oscillator (3), wavelength converter (18) to convert the oscillation laser to a harmonic and electrooptic modulator (5) to modulate the harmonic to a modulation harmonic in series to mirror-1 (7) of the optical resonator (1); path-3 (p3) that connects mirror-1 (7) of the optical resonator (1) and feedback control system (6) to make an error signal from the modulation harmonic in series to the piezoelectric device (9) of the optical resonator (1). In the p1, oscillation laser (10) being oscillated by the laser oscillator (3) is introduced into the wavelength convertor (18), partially converted to a harmonic, successively introduced into the wavelength separation mirror (19a) and separated into the harmonic (20) and a fundamental harmonic (21) (unconverted laser) thereby, the separated fundamental harmonic (21) is introduced into the laser amplifier (2), amplified thereby, led to the wavelength separation mirror (19b) and introduced into the optical resonator (1) through mirror-1 (7). In the p2, the harmonic (20) being separated by the wavelength separation mirror (19a) is introduced into the electrooptic modulator (5), modulated to a modulation harmonic (23) thereby, led to mirror-1 (7) and introduced into the optical resonator (1) through mirror-1 (7). In the p3, the superposition waves of unamplified modulation harmonic (24) being reflected by mirror-1 (7) and harmonic (25) exuding from the optical resonator (1) through mirror-1 (7) are introduced into the feedback control system (6), converted to a feedback control signal (17) thereby and transmitted to the piezoelectric device (9) being attached to the mirror (8). This is the system for the case using one oscillation laser source.

The present invention includes a system for the case using plural oscillation laser sources except for the systems as shown in FIG. 1 and FIG. 2.

Figure 3:
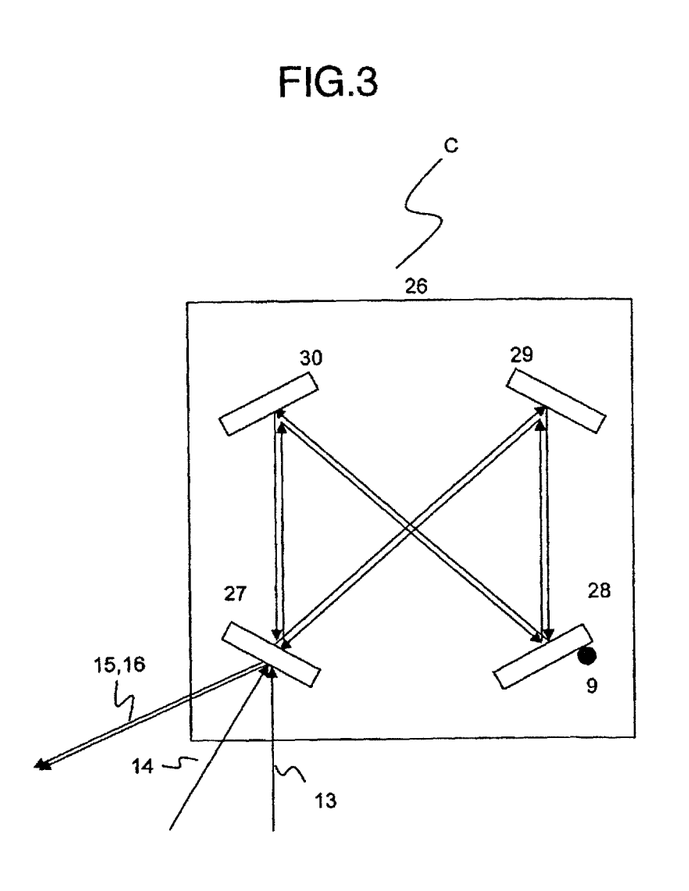
FIG. 3 is a schematic structural view illustrating an execution embodiment of the present invention to tune a 4-mirror optical resonator using unamplified modulation wave.

FIG. 3 shows the optical resonator system (C) which uses a 4-mirror optical resonator instead of the optical resonator (1) as shown in FIG. 1. For sake of avoiding duplication, FIG. 3 shows only an optical system of the 4-mirror optical resonator. The 4-mirror optical resonator (26) includes four flat mirrors (27-30) and the piezoelectric device (9). Because the incident directions introducing the amplified laser (13) and modulation wave (14) in the 4-mirror optical resonator are different from each other, both lasers do not interfere with each other. The 4-mirror optical resonator (26) is arranged so as to superpose a reflection direction of the unamplified modulation wave (14) being reflected by mirror-1 (27) and an exit direction of the modulation wave (15) exuding through mirror-1 (27) and so as to put the two modulation waves (14,15) into the feedback control system (6). The feedback control signal (17) being made by the feedback control system (6) is transmitted to the piezoelectric device (9) being attached to the mirror (27). The four mirrors are preferably to be a mirror with high reflectivity. The laser in the 4-mirror optical resonator (26) can be monitored with a photodiode at the back of any of four mirrors.

Figure 4:
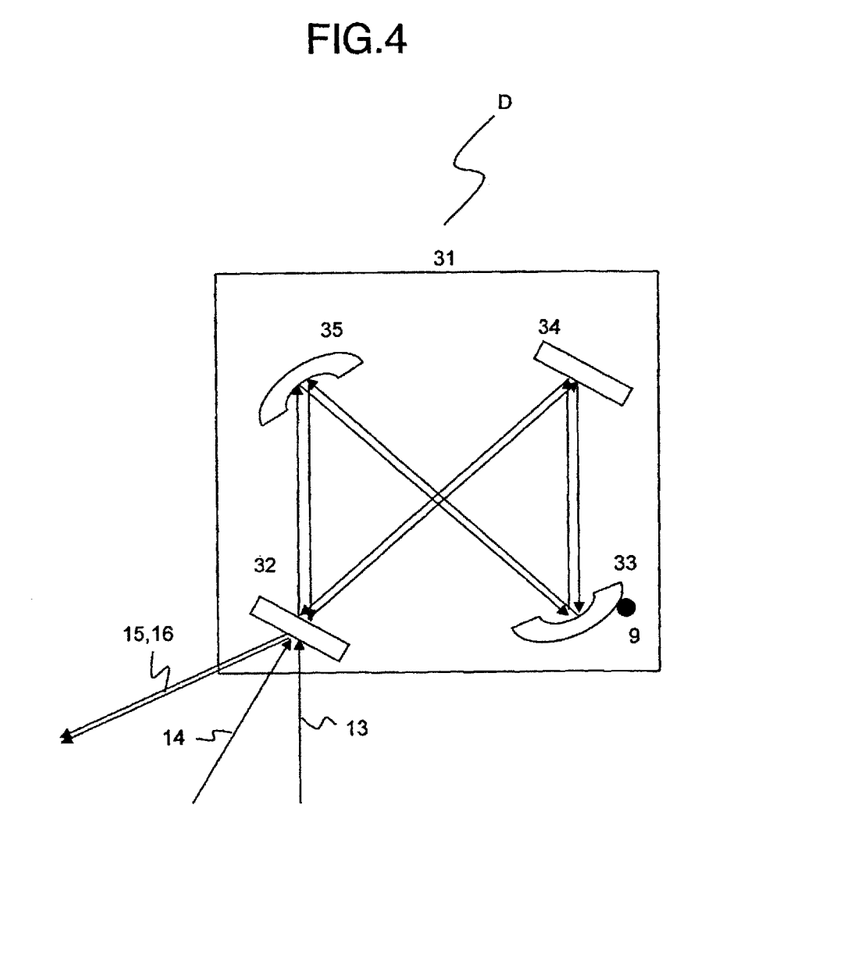
FIG. 4 is a schematic structural view illustrating an execution embodiment of the present invention to tune other 4-mirror optical resonator using unamplified modulation wave.

FIG. 4 shows the optical resonator system (D) which uses other 4-mirror optical resonator instead of the optical resonator (1) as shown in FIG. 1. For sake of avoiding duplication, FIG. 4 shows only an optical system of the 4-mirror optical resonator. The 4-mirror optical resonator (31) includes a pair of flat mirrors (32,34) and a pair of concave mirrors (33,35) and a piezoelectric device (9). Because the incident directions introducing the amplified laser (13) and modulation wave (14) in the 4-mirror optical resonator (31) are different from each other, both lasers do not interfere with each other. The 4-mirror optical resonator (31) is arranged so as to superpose a reflection direction of the unamplified modulation wave (14) being reflected by mirror-1 (32) and an exit direction of the modulation wave (15) exuding through mirror-1 (32) and so as to put the two modulation waves (14, 15) into the feedback control system (6). The feedback control signal (17) being made by the feedback control system (6) is transmitted to the piezoelectric device (9) being attached to the mirror (33). The four mirrors are preferably to be a mirror with high reflectivity. The laser in the 4-mirror optical resonator (31) can be monitored with a photodiode at the back of any of four mirrors. As the 4-mirror optical resonator (31), a two dimensional (2-D) 4-mirror optical resonator which includes a pair of cylindrical concave mirrors and a pair of concave mirrors being arranged in the 2-D plane, a 2-D-4-mirror optical resonator which includes a pair of flat mirrors and a pair of concave mirrors in the 2-D plane, or a three dimensional (3-D) 4-mirror optical resonator which includes a pair of concave mirrors and a pair of flat mirrors being arranged in the 3-D plane can be used.

Figure 5:
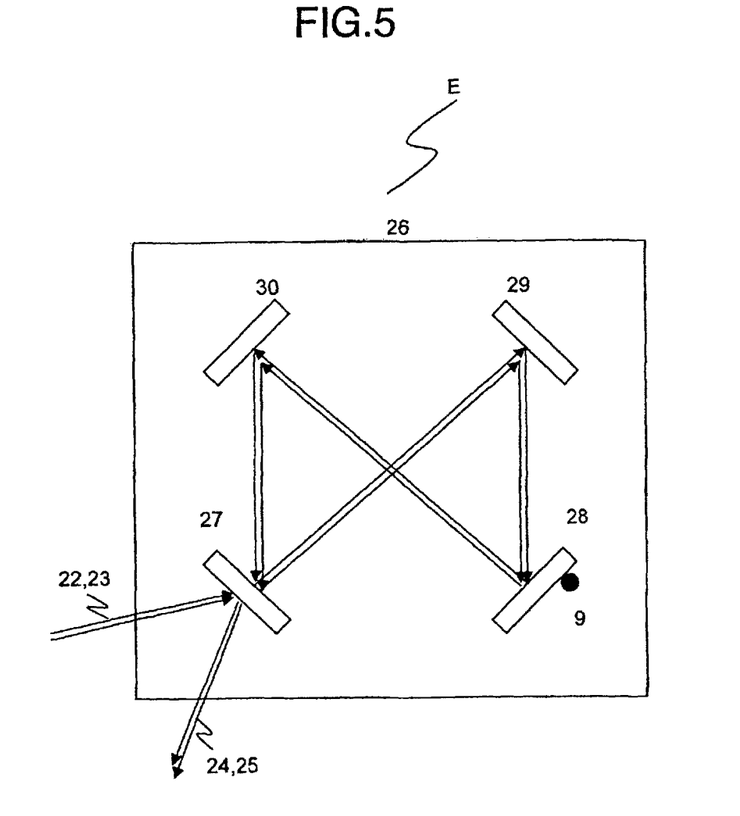
FIG. 5 is a schematic structural view illustrating an execution embodiment of the present invention to tune a 4-mirror optical resonator using unamplified harmonic.

FIG. 5 shows the optical resonator system (E) which uses a 4-mirror optical resonator instead of the optical resonator (1) as shown in FIG. 2. For sake of avoiding duplication, FIG. 5 shows only an optical system of the 4-mirror optical resonator. The 4-mirror optical resonator (26) includes four flat mirrors (27-30) and the piezoelectric device (9). The superposition waves of the modulated harmonic (22) and amplified laser (23) are introduced into the 4-mirror optical resonator (26) via mirror-1 (27). The 4-mirror optical resonator (26) is arranged so as to superpose a reflection direction of the unamplified modulated harmonic (24) being reflected by mirror-1 (27) and an exit direction of the harmonic (25) exuding through mirror-1 (27) and so as to put the two harmonics (24, 25) into the feedback control system (6). The feedback electric signal (17) being made by the feedback control system (6) is transmitted to the piezoelectric device (9) being attached to the mirror (28). The four mirrors are preferably a mirror with high reflectivity. The laser in the 4-mirror optical resonator (1) can be monitored with a photodiode at the back of any of four mirrors.

Figure 6:
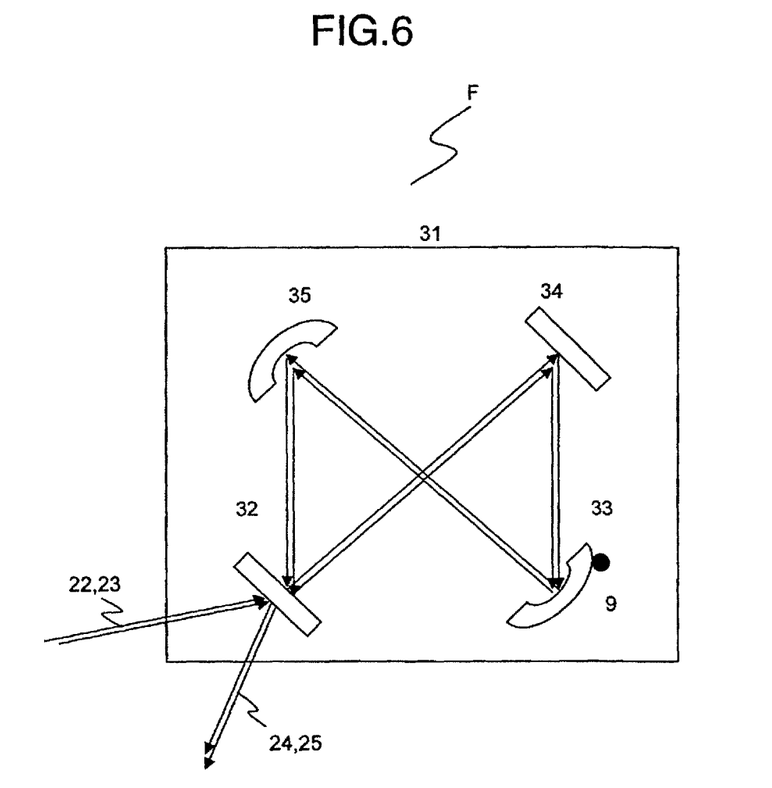
FIG. 6 is a schematic structural view illustrating an execution embodiment of the present invention to tune other 4-mirror optical resonator using unamplified harmonic.

FIG. 6 shows the optical resonator system (F) which uses a 4-mirror optical resonator instead of the optical resonator (1) as shown in FIG. 2. For sake of avoiding duplication, FIG. 6 shows only an optical system of the 4-mirror optical resonator. The 4-mirror optical resonator (31) includes a pair of flat mirrors (32,34) and a pair of concave mirrors (33,35) and a piezoelectric device (9). The superposition waves of the modulated harmonic (22) and amplified laser (23) are introduced in the 4-mirror optical resonator (31) via mirror-1 (32). The 4-mirror optical resonator (31) is arranged so as to superpose a reflection direction of the modulated harmonic (24) being reflected by mirror-1 (30) and an exit direction of the harmonic (25) exuding through mirror-1 (30) and so as to put the two harmonics (24,25) into the feedback control system (6). The feedback electric signal (17) being made by the feedback control system (6) is transmitted to the piezoelectric device (9) being attached to the mirror (33). The four mirrors are preferably a mirror with high reflectivity. The laser in the 4-mirror optical resonator (31) can be monitored with a photodiode at the back of any of four mirrors. As the 4-mirror optical resonator (31), a two dimensional (2-D) 4-mirror optical resonator which includes a pair of cylindrical concave mirrors and a pair of concave mirrors being arranged in the 2-D plane, a 2-D-4-mirror optical resonator which includes a pair of flat mirrors and a pair of concave mirrors in the 2-D plane, or a three dimensional (3-D) 4-mirror optical resonator which includes a pair of concave mirrors and a pair of flat mirrors being arranged in the 3-D plane can be used.

In the present invention, unamplified modulation wave being modulated with amplitude or phase can be used to tune a resonator length of the optical resonator due to the following: the optical resonator used for the present invention usually arranges high-reflectance of mirrors being coated with dielectric multi layers. When some differences in phase between those of incident pulse laser and internal pulse laser in the optical resonator will arise on the surface of the mirror, the superposition waves of both pulse lasers are reflecting a deviation of the resonation position, so that, the superposition waves are introduced into the feedback control system as described later and converted into the feedback control signal due to such a deviation thereby.

In the present invention, unamplified modulation harmonic being modulated with amplitude or phase can be used to tune a resonator length of the optical resonator due to the following: for example, the second harmonic resonates with a fundamental harmonic of mode-lock laser at a 0-degree and 180-degree and generates offsets due to their different phase-rotation characteristics, these factors are constant under a predetermined geometric structure of the optical resonator, so that, the factors can be normalized when adjusting the predetermined optical resonator. The harmonics such as a second harmonic, third harmonic, fifth harmonic, seventh harmonic and the like can be used for the present invention.

The optical resonator being included in the present invention is used to amplify and accumulate laser. The optical resonator includes plural mirrors and piezoelectric device in the inside. Laser being introduced into the optical resonator is repeatedly reflected by the mirrors and a resonator length of the optical resonator corresponding to a length between two mirrors is tuned by the piezoelectric device being attached to the mirror. The optical resonator is preferably put under vacuum circumstance in order to prevent the resonance state from laser scattering due to microparticles and supernatant existing in the optical path. The vacuum is preferably to be $10^{-6}$ Pa or less. The optical resonator is not limited to those as shown in FIGS. 1-6. The optical resonator is preferably a four-mirror (4-mirror) optical resonator having four mirrors so as to arrange a port to introduce the modulation wave or harmonic, a port to introduce the burst-amplified laser, a port to introduce the feedback control signal and a port to monitor laser in the optical resonator. A pair of mirrors of four mirrors is preferably a mirror with high reflectivity for accumulation of strong laser. Reflectance (R) of the mirror is preferably 99.99%≤R<100%. The reason why R is more than 99.99% is to accumulate amplified laser with pulse-strength of 1 mJ or more. The reason why R is less than 100% is to enter or exit laser beam through the mirror. Usually, R is 99.999% or more.

The laser amplifier being included in the present invention, called a burst-amplifier, is used to burst-amplify oscillation laser with instantaneously and extremely high magnification as high as 10,000 times. The laser amplifier is, for example, a non-circular multi-fiber laser amplifier being capable of step-by-step amplification, laser-diode exciting solid-laser oscillator, the present optical resonator, and the like, but is not limited to them. The laser amplifier is preferably a laser amplifier being suitable for pulse-operation. The pulse-operation is properly conditioned according to the operation of the optical resonator.

The laser oscillator being included in the present invention is used to oscillate mode-lock laser with a prescribed wavelength, called a fundamental harmonic of mode-lock laser. The laser oscillator is, for example, a laser diode exciting laser oscillator, fiber laser oscillator, mode-lock laser oscillator coupled with an optical resonator and fiber laser amplifier and the like but is not limited to them. In the present invention, the 1064 nm short pulse laser which is oscillated by a laser diode exciting laser oscillator is usually used.

The electrooptic modulator being included in the present invention is used to apply amplitude modulation or phase modulation to oscillation laser. The electrooptic modulator is, for example, the conventional electrooptic modulator with an optical crystal having an electrooptic effect useful for the used mode-lock laser and the like, but is not limited to them.

A modulation width which is given to oscillation laser or harmonic by the electrooptic modulator is properly determined in accordance to the frequency range of the used mode-lock laser and harmonic. In the present invention, the modulation with several MHz~10 MHz is usually given to the 1062 nm mode-lock laser or 532 nm harmonic.

The wavelength convertor being included in the present invention is used to transform oscillation laser into harmonics such as the second harmonic. For example, the wavelength convertor is a nonlinear optical wavelength convertor having a nonlinear optical crystal material and the like, but is not limited to them. For example, the conventional nonlinear optical wavelength convertor having β-barium borate (BBO) crystals, lithium triborate (LBO) crystals and the like can be usually used.

The feedback control system being included in the present invention is used to make a feedback electric signal from unamplified modulation wave or modulation harmonic, transmits the feedback electric signal to a piezoelectric device of the optical resonator and tune a resonator length of the optical resonator. The feedback control system is preferably an electronic circuit which includes a laser separator, de-modulator, wave detector, lock-in amplifier, servo pump and integrated circuit on which a microprocessor to perform a variety of calculations, a LSI like FPGA (field-programmable gate array) and ASIC (application specific integrated circuit) with a calculating function, is mounted. The laser separator is able to separate the superposition waves into each portion. The de-modulator is able to de-modulate the modulation wave or modulation harmonic. The wave detector is able to transform laser light into an electronic signal, the lock-in amplifier is able to extract an error signal from the electric signal as given by the wave detector, and the servo pump is able to transform the error signal into a mechanical driving signal. That is, the superposition waves of the modulation wave or modulation harmonic (15) being reflected by mirror-1 (7) and the modulation wave or modulation harmonic (16) exuding from the optical resonator (1) through mirror-1 are introduced into the feedback control system (6), separated into each portion by the laser separator and successively de-modulated with a modulated wave by the de-modulator, the wave detector transforms each portion into an electric signal, the lock-in amplifier makes an error signal from the two electric signals, the servo pump transforms the error signal into a mechanical driving signal (17), the mechanical driving signal (17) is transmitted to the piezoelectric device (9), and a resonator length of the optical resonator (1) is controlled by the piezoelectric device (9), resultantly, the resonance of laser in the optical resonator (1) is maintained.

The feedback electric signal being included in the present invention is an electric signal such as an error signal and mechanical driving signal.

The same error signal as the above error signal can be also made by directly putting the modulation signal being loaded by the electrooptic modulator in the lock-in amplifier instead of using the modulated second harmonic (15).

In FIG. 1, the beam splitter (4) being inserted at diverging point of path-1 (p1) and path-2 (p2) is an optic device to split the laser being oscillated by the laser oscillator (1) into two beams. The beam splitter (4) is not always necessary for the present optical resonator system because the beam splitter is not necessary when two laser oscillators are used. Therefore, the beam splitter is a device which may be preferably included in the present invention. The beam splitter is, for example, the conventional beam splitter and the like, but is not limited to them.

In FIG. 2, the wavelength separation mirror (19a,19b) being inserted in path-1 (p1) and path-2 (p2) is an optic device to separate a harmonic being derived by the wavelength convertor (18) and unmodified fundamental harmonic. The wavelength separation mirror is not always necessary for the present optical resonator system because the wavelength separation mirror is not necessary when a laser oscillator to oscillate harmonic is provided. Therefore, the wavelength separation mirror is a device which may be preferably included in the present invention. The wavelength separation mirror is, for example, a dichroic mirror and the like, but is not limited to them. In the present invention, the dichroic mirror which is capable of transmitting the second harmonic and reflecting a fundamental harmonic can be properly selected.

FIGS. 1 and 2 may include an addition of a path in which a portion of the accumulated laser in the optical resonator (1) can be led to the amplifier (2) through any of mirrors, furthermore amplified thereby, led to mirror-1 and introduced into the optical resonator (1).

Figure 7:
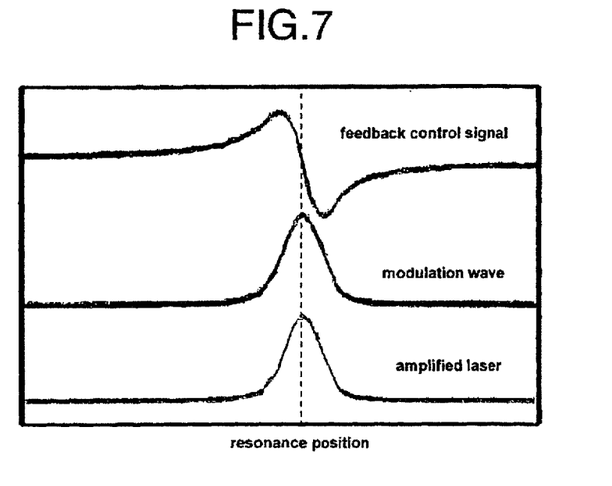
FIG. 7 is the result of the resonance control which is achieved by the present invention using unamplified modulation wave.

Laser is accumulated using the optical resonator system (C). A laser diode exciting laser oscillator to oscillate the 1064 nm mode-lock laser is used as the laser oscillator (3). The 4-mirror optical resonator (26) including four flat mirrors and piezoelectric device is used as the optical resonator. A multi-laser-diode exciting solid-laser-oscillator is used as the laser amplifier. The conventional beam splitter is used as the beam splitter. The conventional electrooptic modulator is used as the electrooptic modulator. The 1064 nm mode-lock laser being oscillated by the laser oscillator is split into two beams by the beam splitter, one split beam is amplified by about 10,000 times (100 W power) by the laser amplifier, the amplified laser is led to mirror-1 (27) and introduced into the 4-mirror optical resonator (26) through mirror-1 (27), on the other hand, another split beam is converted into a modulation wave by the electrooptic modulator, the modulation wave is led to mirror-1 (27), the superposition waves of the modulation wave (15) being reflected by mirror-1 (27) and the modulation wave (16) exuding from the 4-mirror optical resonator (26) through mirror-1 (27) are put into the feedback control system (6), converted into an feedback control signal thereby and transmitted to a piezoelectric device (9) being attached to the mirror (28). The laser amplifier is operated for 1 hour under the condition of 100 µs-10 Hz wherein laser is amplified only for 1 msec in 1 sec. The accumulated laser in the 4-mirror optical resonator (26) is monitored with a photodiode at the back of the mirror (29). Accordingly, it has been confirmed that pulse laser with the pulse strength of 1 mJ or more and with the power of about 1 MW is accumulated in the 4-mirror optical resonator (26). The power of the accumulated pulse laser is about 1 MW in peak power and about 21 kW in average power. The present invention is able to accumulate such strong pulse laser. This is due to the fact that the amplified laser (13) of about 100 W is furthermore amplified by about 10,000 times in the 4-mirror optical resonator (26). That is, the present system is a new system that is able to accumulate a mega-watt class of laser. Nevertheless, the present system is able to maintain the resonance state for long hours without thermal deformation and laser damage of the optical resonator mirror. This is due to the following characteristic of the present system: under the condition of 100 µs-10 Hz to operate the amplifier, which means duration time of the amplified laser in the optical resonator is only 1 msec in 1 sec, heat load to the mirror is 2.1 W or less because heat absorption of the mirror is about 100 ppm or less of the average power of 21 kW and a heat loss on the mirror is only 4.2 W or less because a heat diffusion loss of the mirror is about 200 ppm of the average power of 2.1 kW. Such small heat load and heat loss are too small to induce deformation and laser damage of the resonator mirror. Therefore, the resonance state of laser in the optical resonator can be stably maintained during the accumulation of mega-watt pulse laser. This has been proved from the measurement of waveforms of pulse lasers in the 4-mirror optical resonator. FIG. 7 shows three waveforms, a waveform of the feedback control signal and those of the modulation wave and amplified laser, being monitored at the resonant position in the 4-mirror optical resonator. The superimposed waves of the modulation wave (15) being reflected by mirror-1 (27) and the modulation wave (16) exuding from mirror-1 (27) are separated into each portion, de-modulated with a modulation wave, followed by producing the waveform of the feedback control signal. From FIG. 7, it is confirmed that the waveforms of the modulation wave and amplified laser are observed at the same resonance position, respectively, and positive and negative waveforms of the feedback control signal are well inverted at the peak position of each waveform of the modulation wave and amplified laser. Because the waveform of the feedback control signal is corresponding to the difference between the modulation wave (15) being reflected by mirror-1 (27) and the modulation wave (16) exuding from the 4-mirror optical resonator (26) through mirror-1 (27), the result of FIG. 7 shows the present feedback control system is well operated. That is, the present feedback control system is able to perform the resonator control steadily by using a feedback control signal being made from unamplified modulation wave. The conventional method has utilized laser strength of amplified laser being accumulated in the optical resonator so as to control a resonator length of the optical resonator. Accordingly, heat load to the resonator mirror has been so large that the resonance control during laser amplification has been very difficult and that the resonance control has been temporarily stopped during laser amplification. Through the conventional method, the strength of accumulated laser has been swung with a 100% width. Whereas, the present method uses unamplified modulation wave to control a resonator length, which makes the resonator control be steady during the burst-amplification, then, the present feedback control system is able to improve a swing width of laser strength by about 85%.

Figure 8:
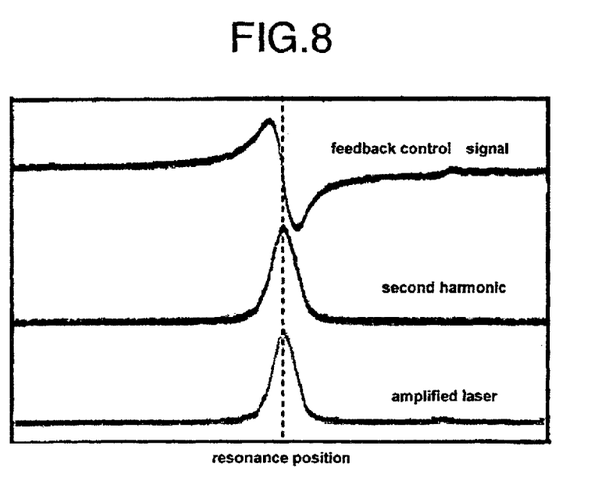
FIG. 8 is the result of the resonance control which is achieved by the present invention using unamplified harmonic.

Laser is accumulated using the optical resonator system (F). A laser diode exciting laser oscillator to oscillate the 1064 nm mode-lock laser is used as the laser oscillator. The 4-mirror optical resonator including a pair of flat mirrors and a pair of concave mirrors and piezoelectric device is used as the optical resonator. A multi-laser-diode exciting solid-laser-oscillator is used as the laser amplifier. A nonlinear optical wavelength convertor using a BBO crystal is used as the wavelength convertor. A Nd:YAG/SHG dichroic mirror is used as the wavelength separation mirror. The 1064 nm mode-lock laser being oscillated by the laser oscillator is partially converted to the second harmonic by the laser wavelength convertor, separated into the second harmonic and unmodified laser by the wavelength separation mirror, the separated second harmonic is modulated with about 5 MHz by the electrooptic modulator, the modulated second harmonic is led to the wavelength separation mirror, on the other hand, the separated unmodified laser is amplified by about 10,000 times (100 W power) by the laser amplifier, and the amplified laser is led to the wavelength separation mirror. The modulated second harmonic and amplified laser are superimposed by the wavelength separation mirror, led to mirror-1 (32), and introduced into the 4-mirror optical resonator (31) through mirror-1 (32). On the other hand, the superposition waves of the modulated second harmonic (24) being reflected by mirror-1 (32) and the second harmonic (25) exuding from the 4-mirror optical resonator (31) through mirror-1 (32) are put into the feedback control system (6), converted to an feedback control signal thereby, and transmitted to a piezoelectric device (9) being attached to a mirror (33). The laser amplifier is operated for 1 hour under the condition of 100 µs-10 Hz wherein laser is amplified only for 1 msec in 1 sec. The accumulated laser in the 4-mirror optical resonator (31) is monitored with a photodiode at the back of the mirror (34). Accordingly, it has been confirmed that pulse laser with the pulse strength of 1 mJ or more and with a power of about 1 MW is accumulated in the 4-mirror optical resonator (31). The power of the accumulated pulse laser is about 1 MW in peak power and about 21 kW in average power. The present invention is able to accumulate such strong pulse laser. This is due to the fact that the amplified laser (13) of about 100 W is furthermore amplified by about 10,000 times in the optical resonator (31). That is, the present system is a new system that is able to accumulate a mega-watt class of laser. Nevertheless, the present system is able to maintain the resonance state for long hours without thermal deformation and laser damage of the optical resonator mirror. This is due to the following characteristic of the present system: under the condition of 100 µs-10 Hz to operate the amplifier, which means duration time of the amplified laser in the optical resonator is only 1 msec in 1 sec, heat load to the mirror is 2.1 W or less because heat absorption of the mirror is about 100 ppm or less of the average power of 21 kW and a heat loss on the mirror is only 4.2 W or less because a heat diffusion loss of the mirror is about 200 ppm of the average power of 2.1 kW. Such small heat load and heat loss are too small to induce deformation and laser damage of the resonator mirror. Therefore, the resonance state of laser in the present system can be stably maintained during the accumulation of MW-power laser. This has been proved from the measurement of waveforms of pulse lasers in the 4-mirror optical resonator. FIG. 8 shows three waveforms, a waveform of the feedback control signal and those of the second harmonic and amplified laser, which are monitored at the resonant position in the 4-mirror optical resonator. The superimposed waves of the modulated second harmonic (24) being reflected by mirror-1 (32) and the second harmonic (25) exuding from the optical resonator (31) through mirror-1 (32) are separated into each portion, de-modulated with a modulation wave, followed by producing the waveform of the feedback control signal. From FIG. 8, it is confirmed that the waveforms of the modulated second harmonic and amplified laser are observed at the same resonance position, respectively, and positive and negative waveforms of the feedback control signal are well inverted at the peak position of each waveform of the modulated second harmonic and amplified laser. Because the waveform of the feedback control signal is corresponding to the difference between the modulated second harmonic (24) being reflected by mirror-1 (32) and the second harmonic (25) exuding from the 4-mirror optical resonator (31) through mirror-1 (32), the result of FIG. 8 shows the present feedback control system is well operated. That is, the present feedback control system is able to perform the resonance control steadily by using a feedback control signal being made from unamplified harmonic. The conventional method has utilized laser strength of amplified laser being accumulated in the optical resonator so as to control a resonator length. Accordingly, heat load to the resonator mirror has been so large that the resonance control during laser amplification has been very difficult and that the resonance control has been temporarily stopped during laser amplification. Through the conventional method, the strength of accumulated laser has been swung with a 100% width. Whereas, the present method uses unamplified harmonic to control a resonator length, which makes the resonator control be steadily, then, the present feedback control system is able to improve a swing width of laser strength by about 85%.

It should be further understood by those skilled in the art that although the foregoing description has been made on embodiments of the invention, the invention is not limited thereto and various changes and modifications may be made without departing from the spirit of the invention and the scope of the appended claims.

INDUSTRIAL APPLICABILITY

The present invention has industrial applicability as relating to a laser-source to generate laser Compton scattering X-ray, a laser oscillator to generate strong laser and the like. The present invention is useful for a variety of industrial usages such as medical instrument, diagnostic instrument, material analyzer, material structure analyzer, and the like.

What is claimed is:

1. An optical resonator system, comprising:
   an optical resonator including a mirror-1;
   a path-1 that connects in series a laser oscillator for emitting an oscillation laser and a laser amplifier for amplifying the oscillation laser, the path-1 being configured to convey an amplified oscillation laser from the laser amplifier to the mirror-1 of the optical resonator;
   a path-2 that connects in series the laser oscillator and an electrooptic modulator for modulating the oscillation laser into a modulation wave, the path-2 being configured to convey an unamplified modulation wave from the electrooptic modulator to the mirror-1 of the optical resonator; and
   a path-3 that connects in series the mirror-1 of the optical resonator and a feedback control system for converting the unamplified modulation wave into a feedback control signal and conveying the feedback control signal to a piezoelectric device of the optical resonator, the path-3 being configured to introduce into the feedback control system a superimposed wave consisting of (i) a first series of the unamplified modulation wave reflected by the mirror-1 without entering the optical resonator and (ii) a second series of the unamplified modulation wave that enters the optical resonator through the mirror-1 and thereafter exudes from the mirror-1, wherein the feedback system is configured to convert the superimposed wave into the feedback control signal, which operates the piezoelectric device of the optical resonator to adjust a resonator length of the optical resonator.

2. The optical resonator system according to claim 1: wherein, the optical resonator is a 4-mirror optical resonator.

3. An optical resonator system, comprising:
   an optical resonator including a mirror-1;
   a path-1 that connects in series a laser oscillator for emitting an oscillation laser and a laser amplifier for amplifying the oscillation laser, the path-1 being configured to convey an amplified oscillation laser from the laser amplifier to the mirror-1 of the optical resonator;
   a path-2 that connects the laser oscillator, a wavelength converter for converting the oscillation laser in to a harmonic and an electrooptic modulator for modulating the harmonic into a modulation harmonic, the path-2 being configured to convey an unamplified modulation harmonic from the electrooptic modulator to the mirror-1 of the optical resonator;
   a path-3 that connects in series the mirror-1 of the optical resonator and a feedback control system for converting the unamplified modulation harmonic into a feedback control signal and conveying the feedback control signal to a piezoelectric device of the optical resonator, the path-3 being configured to introduce into the feedback control system a superimposed harmonic consisting of (i) a first series of the unamplified modulation harmonic reflected by the mirror-1 without entering the optical resonator and (ii) a second series of the unamplified modulation harmonic that enters the optical resonator through the mirror-1 and thereafter exudes from the mirror-1, wherein the feedback system is configured to convert the superimposed harmonic into the feedback control signal, which operates the piezo-electric device of the optical resonator to adjust a resonator length of the optical resonator.

4. The optical resonator system according to claim 3: wherein, the optical resonator is a 4-mirror optical resonator.

* * * * *